US010151610B2

United States Patent
Umezawa et al.

(10) Patent No.: US 10,151,610 B2
(45) Date of Patent: Dec. 11, 2018

(54) FLOW RATE MEASUREMENT DEVICE AND FLOW RATE MEASUREMENT METHOD

(71) Applicants: Tokyo Electric Power Company Holdings, Incorporated, Tokyo (JP); TOKYO INSTITUTE OF TECHNOLOGY, Tokyo (JP)

(72) Inventors: Shuichi Umezawa, Tokyo (JP); Katsuhiko Tanaka, Tokyo (JP); Masaki Yokosaka, Tokyo (JP); Ryoji Miyauchi, Tokyo (JP); Tatsuya Kawaguchi, Tokyo (JP); Hiroshige Kikura, Tokyo (JP); Nobuyoshi Tsuzuki, Tokyo (JP); Keisuke Tsukada, Tokyo (JP)

(73) Assignees: TOKYO ELECTRIC POWER COMPANY HOLDINGS, INCORPORATED, Tokyo (JP); TOKYO INSTITUTE OF TECHNOLOGY, Tokyo (JP)

( * ) Notice: Subject to any disclaimer, the term of this patent is extended or adjusted under 35 U.S.C. 154(b) by 20 days.

(21) Appl. No.: 15/324,849

(22) PCT Filed: Jul. 23, 2015

(86) PCT No.: PCT/JP2015/070993
§ 371 (c)(1),
(2) Date: Jan. 9, 2017

(87) PCT Pub. No.: WO2016/013623
PCT Pub. Date: Jan. 28, 2016

(65) Prior Publication Data
US 2017/0219400 A1   Aug. 3, 2017

(30) Foreign Application Priority Data

Jul. 23, 2014   (JP) .................................. 2014-150141

(51) Int. Cl.
*G01F 1/66*   (2006.01)

(52) U.S. Cl.
CPC .............. *G01F 1/662* (2013.01); *G01F 1/667* (2013.01)

(58) Field of Classification Search
CPC ........................................................ G01F 1/66
See application file for complete search history.

(56) References Cited

U.S. PATENT DOCUMENTS

| 7,185,547 | B2 * | 3/2007 | Baumoel | ................. | G01F 1/662 |
| | | | | | 73/861.25 |
| 9,448,092 | B1 * | 9/2016 | Hawwa | ................... | G01F 1/663 |

(Continued)

FOREIGN PATENT DOCUMENTS

| JP | S59-161035 U | 10/1984 |
| JP | S61-28821 A | 2/1986 |

(Continued)

OTHER PUBLICATIONS

GE Sensing&Inspection Technologies, Portable Ultrasonic Gas Flow Meter PT878GC, retrieval date: May 1, 2014, Internet URL:http://www.gesensing.jp/product/pdf/flow/pt878gc.pdf, including English translation.

(Continued)

*Primary Examiner* — Jewel V Dowtin
(74) *Attorney, Agent, or Firm* — Drinker Biddle & Reath LLP

(57) ABSTRACT

A flow rate measurement device is configured to measure a flow rate of a gas flowing inside of a pipeline, and includes an ultrasonic transducer installed so as to be in contact with the pipeline, and a flow rate calculation part configured to calculate the flow rate of the gas according to a result of reception of ultrasonic wave from the ultrasonic transducer, wherein the ultrasonic transducer includes an ultrasonic oscillation part configured to emit the ultrasonic wave toward the inside of the pipeline and an ultrasonic reception part configured to receive the ultrasonic wave, and at least the ultrasonic oscillation part has a focusing part configured to focus the ultrasonic wave on a center of the pipeline.

15 Claims, 6 Drawing Sheets

(56) References Cited

U.S. PATENT DOCUMENTS

| | | | | |
|---|---|---|---|---|
| 9,494,454 B2* | 11/2016 | Baumoel | ............... | G01F 1/667 |
| 9,874,466 B2* | 1/2018 | Leaders | ............... | G01F 1/663 |
| 2011/0277558 A1* | 11/2011 | Dietz | ............... | G01F 1/662 |
| | | | | 73/861.31 |
| 2016/0265954 A1* | 9/2016 | Bachmann | ............... | G01F 15/00 |
| 2017/0328751 A1* | 11/2017 | Lemke | ............... | G01F 1/668 |
| 2017/0336231 A1* | 11/2017 | Herrmann | ............... | G01F 1/662 |
| 2018/0010941 A1* | 1/2018 | Baumoel | ............... | G01F 1/667 |

FOREIGN PATENT DOCUMENTS

| | | |
|---|---|---|
| JP | S61-55696 A | 3/1986 |
| JP | H02-7524 U | 1/1990 |
| JP | H02-110825 U | 9/1990 |
| JP | H05-264310 A | 10/1993 |
| JP | H06-294671 A | 10/1994 |
| JP | 2000-266577 A | 9/2000 |

OTHER PUBLICATIONS

International Search Report dated Aug. 18, 2015 for PCT/JP2015/070993.

* cited by examiner

FLOW RATE MEASUREMENT DEVICE AND FLOW RATE MEASUREMENT METHOD

TECHNICAL FIELD

The present invention relates to a flow rate measurement device and a flow rate measurement method.

Priority is claimed on Japanese Patent Application No. 2014-150141, filed Jul. 23, 2014, the contents of which are incorporated herein by reference.

BACKGROUND ART

In the related art, as an ultrasonic flow rate measurement device configured to measure a flow rate of a fluid flowing through a pipeline, a device configured to detect a flow rate of a fluid flowing through a pipeline using a planar sensor installed on a surface of the pipeline is known (for example, see Non-Patent Document 1)

CITATION LIST

Non-Patent Document

[Non-Patent Document 1]

GE Sensing & Inspection Technologies Co. Ltd., Sensing Sales and Marketing Division, "Portable ultrasonic gas flow meter PT878GC", [Accessed on May 1, 2014 (H26)], the Internet (URL: http://www.gesensing.jp/product/pdf/flow/pt878gc.pdf)

SUMMARY OF INVENTION

Technical Problem

However, in the above-mentioned ultrasonic flow rate measurement device, it is difficult for a planar sensor to efficiently cause ultrasonic waves to enter the pipeline, and it is difficult to precisely perform flow rate measurement. In addition, since measurement conditions such as a pipeline diameter, thickness, or the like, are extremely limited, measurement targets are limited, and in particular, there is room for improvement in versatility with respect to a pipeline having a small diameter.

An aspect of the present invention is directed to provide a flow rate measurement device and a flow rate measurement method that are capable of providing good versatility and precisely measuring a flow rate of a gas flowing through a pipeline even under different measurement conditions.

Solution to Problem

According to a first aspect of the present invention, there is provided a flow rate measurement device for measuring a flow rate of a gas flowing inside of a pipeline, the flow rate measurement device including: an ultrasonic transducer installed so as to be in contact with the pipeline; and a flow rate calculation part configured to calculate the flow rate of the gas according to a result of reception of ultrasonic wave from the ultrasonic transducer, wherein the ultrasonic transducer includes an ultrasonic oscillation part configured to emit he ultrasonic wave toward the inside of the pipeline and an ultrasonic reception part configured to receive the ultrasonic wave, and at least the ultrasonic oscillation part has a focusing part configured to focus the ultrasonic wave on a center of the pipeline.

In addition, in the first aspect, the focusing part may have an ultrasonic-wave-oscillating-surface having a curvature corresponding to an outer surface of the pipeline.

In addition, in the first aspect, the ultrasonic reception part may have a second focusing part, and the second focusing part may have an ultrasonic-wave-receiving-surface having a curvature corresponding to an outer surface of the pipeline.

In addition, in the first aspect, the flow rate measurement device may further include a damping material installed on the pipeline.

In addition, in the first aspect, the flow rate measurement device may further include a spacer member that is detachably provided between the pipeline and the ultrasonic transducer, wherein the spacer member has an inner diameter equal to a curvature of an outer surface of the pipeline and an outer diameter equal to a curvature of the ultrasonic-wave-oscillating-surface.

In addition, in the first aspect, the flow rate measurement device may further includes a determination part configured to determine a deviation of flow velocity distribution of the gas in the pipeline according to measurement results of a plurality of ultrasonic transducers installed at a plurality of places in a circumferential direction of the pipeline; and a selection part configured to select one from the plurality of ultrasonic transducers used for measurement according to a determination result of the determination part.

In addition, in the first aspect, a center frequency of the ultrasonic wave from the ultrasonic transducer may be set to 100 kHz to 1 MHz.

In addition, in the first aspect, the flow rate of a gas may be measured through a tuft method.

A flow rate measurement method according to a second aspect of the present invention is a flow rate measurement method of measuring a flow rate of a gas flowing inside of a pipeline, the method including a receiving step of receiving ultrasonic wave emitted toward the inside of the pipeline using an ultrasonic transducer including an ultrasonic oscillation part configured to emit the ultrasonic wave toward the inside of the pipeline and an ultrasonic reception part configured to receive the ultrasonic wave emitted by the ultrasonic oscillation part, wherein at least the ultrasonic oscillation part has a focusing part configured to focus the ultrasonic wave on a center of the pipeline; and a flow rate calculation step of calculating the flow rate of the gas according to a result received in the receiving step.

In addition, in the second aspect, in the receiving step, the focusing part having an ultrasonic-wave-oscillating-surface with a curvature corresponding to an outer surface of the pipeline is used as the ultrasonic transducer.

In addition, in the second aspect, in the receiving step, the ultrasonic reception part having a second focusing part may be used as the ultrasonic transducer, and the second focusing part may have an ultrasonic-wave-receiving-surface having a curvature corresponding to the outer surface of the pipeline.

In addition, in the second aspect, in the receiving step, a damping material may be disposed at the pipeline.

In addition, in the second aspect, the flow rate measurement method may include, previous to the receiving step, a determination step for determining a deviation of flow velocity distribution of the gas in the pipeline according to a result obtained by measuring a flow rate of the gas at a plurality of places in a circumferential direction of the pipeline; and a selection step of selecting the ultrasonic transducer used in the receiving step according to the result of the determination step.

In addition, in the second aspect, a center frequency of the ultrasonic wave from the ultrasonic transducer may be set to 100 kHz to 1 MHz.

In addition, in the second aspect, the flow rate of the gas may be measured using a tuft method.

Advantageous Effects of Invention

According to the aspect of the present invention, it is possible to provide good versatility and precisely measure a flow rate of a gas flowing through a pipeline under different measurement conditions.

DESCRIPTION OF EMBODIMENTS (First embodiment)

Hereinafter, a first embodiment of the present invention will be described with reference to the accompanying drawings. A flow rate measurement device according to the embodiment is a system disposed between a steam manufacturing apparatus such as a boiler or the like and a load facility and is configured to measure a flow rate of a gas (for example, steam) flowing through a pipeline. In addition, the flow rate measurement device of the embodiment is a device configured to measure the flow rate of a gas flowing through a pipeline using ultrasonic waves.

Figure 1:
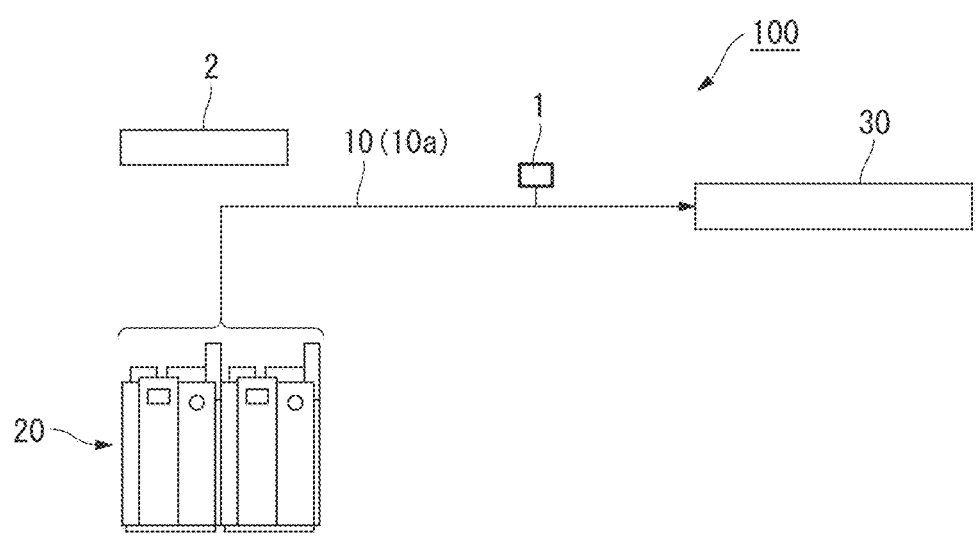
FIG. 1 is a view showing a schematic configuration of a flow rate measurement device according to a first embodiment.
Figure 2A:
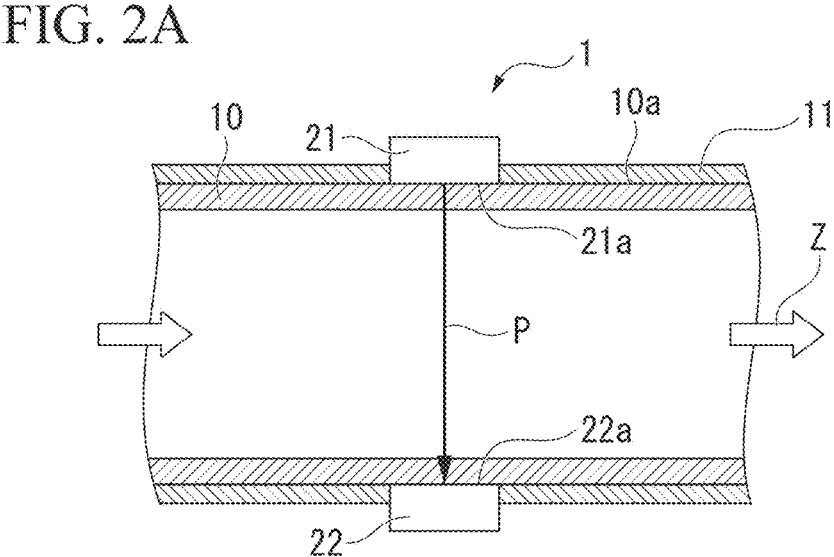
FIG. 2A is a cross-sectional view showing a schematic configuration of an ultrasonic transducer.
Figure 2B:
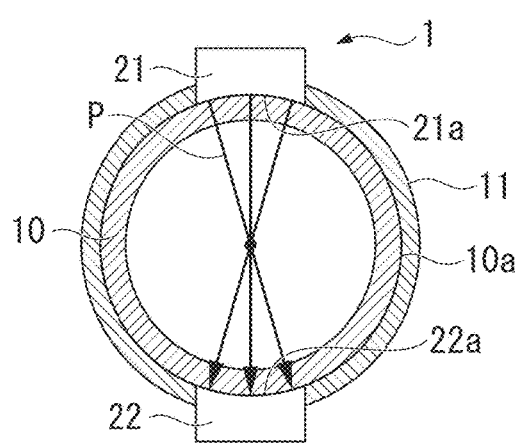
FIG. 2B is a cross-sectional view showing a schematic configuration of an ultrasonic transducer.

FIG. 1 is a view showing a schematic configuration of a flow rate measurement device according to the embodiment. FIGS. 2A and 2B are views showing major parts of the flow rate measurement device.

As shown in FIG. 1, a flow rate measurement device 100 according to the embodiment includes an ultrasonic transducer 1 and a controller 2. In FIG. 1, a pipeline 10 is disposed between a steam manufacturing apparatus 20 (a boiler or the like) and a load facility 30. Steam flows through the pipeline 10 from the steam manufacturing apparatus 20 to be delivered to the load facility 30. In the load facility 30, the steam or heat of the steam is used. The steam discharged from the load facility 30 is collected as a condensate in a condensate receiver tank (not shown), and then, water is supplied again into the steam manufacturing apparatus 20.

In the related art, a flow rate of a fluid (liquid) flowing through a pipeline can be measured using ultrasonic waves from the outside without breaking the pipeline. Hereinafter, a type of measurement of a flow rate of a fluid flowing through a pipeline from the outside using an ultrasonic transducer installed at a surface of the pipeline without damaging the pipeline is referred to as a clamp-on method.

When the flow rate of the liquid in the pipeline is measured by the above-mentioned clamp-on method, a transmission/reception path of ultrasonic waves is formed in a pipeline material (solid), a liquid, and a pipeline material (solid). In this case, while energy loss due to reflection of acoustic waves at a solid-fluid interface occurs, transmission and reception of an ultrasonic signal can be substantially appropriately performed. This is because matching of acoustic impedance serving as a product of a sound velocity and a density of a medium between the solid and the liquid is relatively better. That is, ratios of density and sound velocity between the solid and the liquid are about several times to ten times.

Meanwhile, when a flow rate of a gas (for example, steam) flowing through the pipeline is measured using ultrasonic waves, a considerable difference in the acoustic impedance between the solid and the gas should be avoided. For this reason, when the flow rate of the gas flowing through the pipeline is measured, measurement of the flow rate of the gas by the clamp-on method becomes difficult.

Here, when the flow rate of the gas flowing through the pipeline is measured, a method of installing an ultrasonic oscillator and a receiver in a pipeline is generally used. In this case, a dedicated flange-attached measurement part is necessary to be inserted into the pipeline through a through-hole provided at a steel pipe. For this reason, it was necessary to temporarily stop a plant and perform an operation for cutting the pipeline.

Further, the ultrasonic transducer used for measurement of a flow rate in the related art is constituted by a planar sensor having a flat oscillating surface. When ultrasonic waves enter the pipeline, since only acoustic waves passing through a center of the pipeline penetrate the pipeline and acoustic waves deviating from the center of the pipeline are reflected or refracted by a curvature of the pipeline, the acoustic waves deviating from the center of the pipeline cannot be received in the planar sensor. In addition, the planar sensor can receive the guided waves (noise component) that are propagated through the pipeline. For this reason, when the planar sensor is used in measurement of the flow rate of the gas of the above-mentioned clamp-on method, transmission and reception of an ultrasonic signal cannot be appropriately performed, and it is difficult to precisely perform the flow rate measurement.

The inventors have obtained knowledge that a shape of the ultrasonic transducer (sensor) is important for efficiently introducing ultrasonic waves into the pipeline when the flow rate of a gas flowing through the pipeline is measured through the clamp-on method.

FIGS. 2A and 2B are views showing a schematic configuration of the ultrasonic transducer 1. FIG. 2A is a cross-sectional view in a tube axis direction of the pipeline 10. FIG. 2B is a cross-sectional view seen in the tube axis direction of the pipeline 10. As shown in FIG. 2A, the ultrasonic transducer 1 is installed while being in contact with a surface 10a of the pipeline 10 (a clamp-on method). The ultrasonic transducer 1 includes a first element 21 and a second element 22. The first element 21 and the second element 22 can transmit and receive the ultrasonic waves. An arrow Z in FIG. 2A designates a direction in which steam flows.

In the embodiment, the first element 21 functions as an ultrasonic oscillation part configured to emit ultrasonic waves P toward the inside of the pipeline 10. The second element 22 functions as an ultrasonic reception part configured to receive the ultrasonic waves P emitted from the first element 21.

In the ultrasonic transducer 1, a center frequency thereof is preferable to be tens of kHz to several MHz. When the center frequency is hundreds of kHz or more, there is an advantage in that the influence of environmental noise is decreased. When the center frequency is several MHz or less, there is an advantage in that an attenuation factor in air of the ultrasonic waves is decreased. In the embodiment, the center frequency is set within 100 kHz to 1 MHz, for example, 500 kHz.

The first element 21 and the second element 22 of the embodiment are constituted by curved surface sensors having a curvature corresponding to the surface 10a of the pipeline 10 to efficiently introduce the ultrasonic waves P into the pipeline 10.

Specifically, as shown in FIG. 2B, in the first element 21, an oscillating surface 21a configured to emit ultrasonic waves has a curved surface (a cross-sectional shape is a circle) corresponding to the surface 10a of the pipeline 10. That is, as the oscillating elements of the ultrasonic waves are disposed in a curved surface shape, the oscillating surface 21a can cause the emitted ultrasonic waves to converge on a center of the pipeline 10. In the embodiment, the oscillating surface 21a constitutes a focusing means configured to focus ultrasonic waves on a center of the pipeline 10.

In addition, as shown in FIG. 2B, in the second element 22, a receiving surface 22a configured to receive ultrasonic waves has a curved surface (a cross-sectional shape is a circle) with respect to the surface 10a of the pipeline 10. Accordingly, the ultrasonic waves focused on the center of the pipeline 10 enter perpendicularly to the receiving surface 22a.

Here, an aspect in which the oscillating surface 21a and the receiving surface 22a correspond to the surface 10a is not limited to an aspect in which the oscillating surface 21a and the receiving surface 22a come in direct contact with the surface 10a. For example, the aspect also includes an aspect in which the oscillating surface 21a and the receiving surface 22a come in indirect contact with the surface 10a when a wedge-shaped spacer member is disposed in a gap between the ultrasonic transducer 1 and the pipeline 10.

Figure 3:
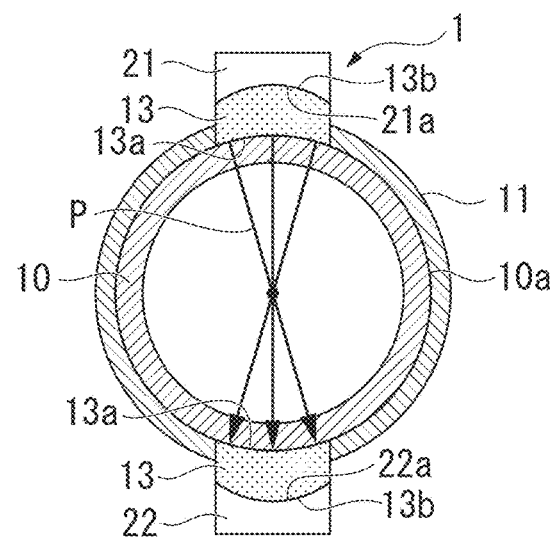
FIG. 3 is a view showing a configuration of a spacer member.

FIG. 3 is a view showing a schematic configuration of the spacer member. As shown in FIG. 3, each of spacer members 13 has an inner diameter 13a that coincides with a curvature of the surface 10a and an outer diameter 13b that coincides with curvatures of the oscillating surface 21a and the receiving surface 22a. For example, when a plurality of spacer members 13 having different inner diameters 13a are used, one ultrasonic transducer 1 can perform flow rate measurement with respect to various pipelines 10 having surfaces 10a having different diameters. Accordingly, the flow rate measurement device 100 that is not dependent on the diameter of the pipeline 10 and having good versatility is provided.

In addition, in the embodiment, a portion of the pipeline 10 may be covered with a damping material 11. The damping material 11 is formed over the pipeline in the tube axis direction excluding an installation portion of the ultrasonic transducer 1 (the first element 21 and the second element 22).

The damping material 11 is preferably a member having a high acoustic attenuation effect, and for example, may be a clay-like or paste-like material, a sound absorbing material (a punched metal), a polymer material, or the like. In addition, in a case in which a surface temperature of the pipeline 10 is increased as the steam flows therethrough, a material having thermal resistance in addition to an acoustic attenuation effect is preferable to be used as the damping material 11.

Figure 4:
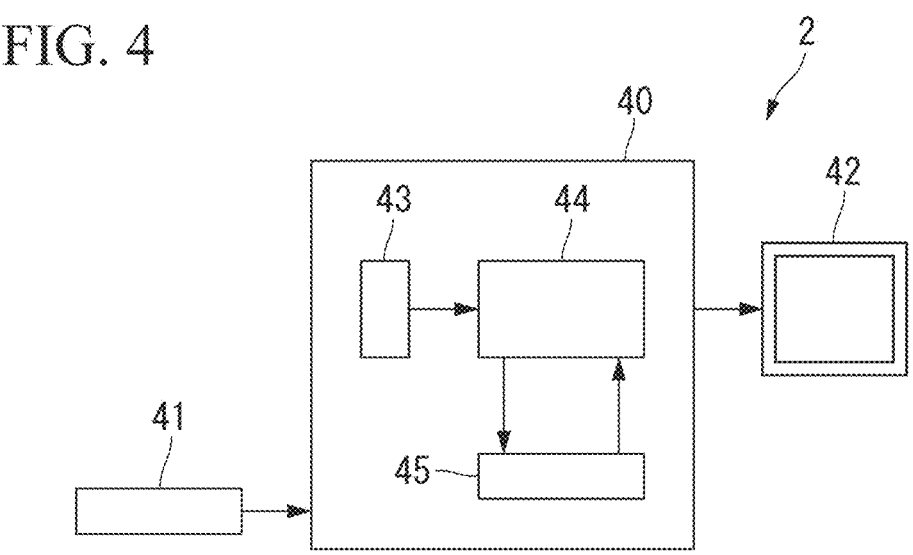
FIG. 4 is a schematic view showing a configuration of a controller.

FIG. 4 is a schematic view showing a configuration of the controller 2. As shown in FIG. 4, the controller 2 has an input device 41 and a display device (an output device) 42, in addition to a calculation device 40. The calculation device 40 has a converter 43 such as an A/D converter or the like, a CPU (an arithmetic processing means) 44, a memory 45, and so on. Measurement data (ultrasonic measurement results) sent from the ultrasonic transducer 1 of the flow rate measurement device 100 is converted by the converter 43 or the like according to necessity and incorporated into the CPU 44. In addition, initial setting values, temporary data, and so on, are incorporated into the calculation device 40 via the input device 41 or the like. The display device 42 can display information related to input data, information related to calculation, and so on.

The CPU 44 can calculate a flow rate of the steam flowing through the pipeline 10 according to the measurement data, and information stored in the memory 45. The CPU 44 calculates, for example, a flow velocity of the steam obtained using the received results of the ultrasonic transducer 1 (spatial distribution of ultrasonic waves in the pipeline 10), and a flow rate of the steam flowing through the pipeline 10 from the information stored in the memory 45, which will be described below (a cross-sectional area of the pipeline 10, a density of the steam). Here, a flow rate Q of the steam is calculated from a product ($Q=V \times A \times \rho$) of a flow velocity V of the steam, a cross-sectional area A of the pipeline 10, and a density $\rho$ (that can be calculated from a temperature and a pressure thereof) of the steam. That is, the controller 2 constitutes a flow rate calculation part (corresponding to a flow rate calculation part in claims) configured to calculate the flow rate of the steam flowing through the pipeline 10.

In the embodiment, either of a tuft method or a time difference method may be applied as a flow rate measurement method of the flow rate measurement device 100.

The tuft method is a method of oscillating ultrasonic waves parallel to a cross section of the pipeline, i.e., perpendicular to the tube axis, and determining a flow rate from a spatial movement quantity of an acoustic intensity distribution using a sensor installed at an opposite position.

The time difference method is a method of installing two ultrasonic transmitter/receivers to be inclined with respect to a tube axis of the pipeline, obtaining an arrival time in an approach route of ultrasonic waves from upstream to downstream and an arrival time in a return path of ultrasonic waves from downstream to upstream, and thus, determining a flow rate from a variation between the arrival times according to the velocity of a gas.

The flow rate measurement device 100 of the embodiment is an exemplary example of a case in which flow rate measurement is performed by a tuft method. As described above, since the tuft method causes ultrasonic waves to enter the pipeline 10 perpendicularly as described above, ultrasonic waves can appropriately enter the pipeline 10 by suppressing reflection and retraction at an interface thereof.

Here, the effectiveness of the flow rate measurement device 100 of the embodiment will be described using analysis results of a simulation of ultrasonic signals that can be received when ultrasonic flow rate measurement is performed through the clamp-on method.

The simulation performs calculation by modeling the case in which measurement is performed by a tuft method. In addition, in the analysis, Voxel type finite element method is used, properties such as an inner diameter, an outer diameter, a material, and so on, of the tube are the same as those of the flow rate measurement device 100, and ultrasonic signals are burst waves obtained by periodically sending intermittent sine waves. Further, when ultrasonic propagation numerical calculation is performed, the sound velocity and the density of steam are important properties. Since the velocity of sound in steam depends on the pressure temperature, the sound velocity of saturated steam was calculated on the assumption that steam is a perfect gas.

Figure 5:
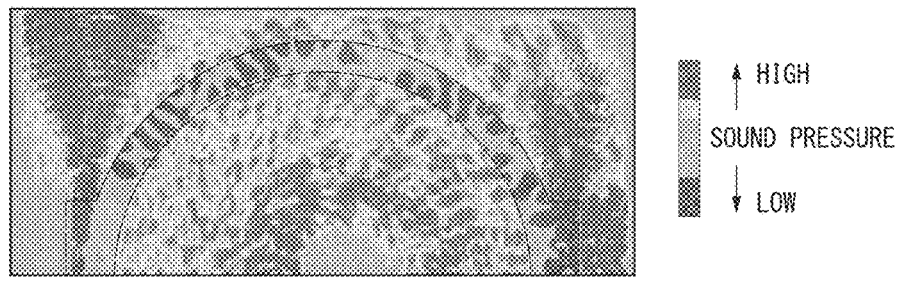
FIG. 5 is a view showing analysis results when a planar sensor in the related art is used.
Figure 6:
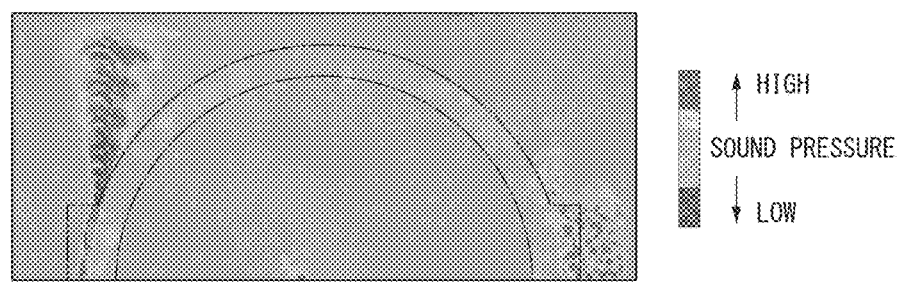
FIG. 6 is a view showing analysis results when a curved surface sensor is used.
Figure 7:
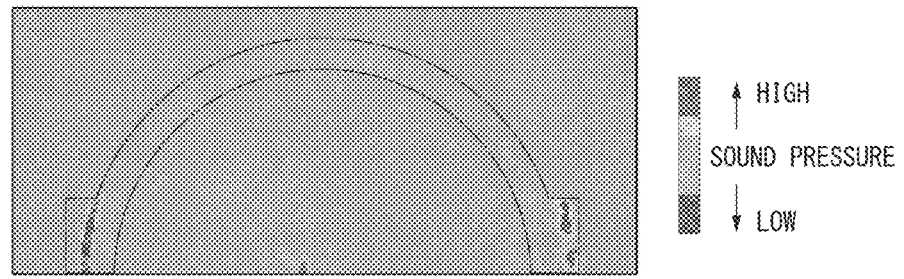
FIG. 7 is a view showing analysis results when a curved surface sensor and a damping material are installed.

FIG. 5 is a view showing analysis results when a planar sensor of the related art is used. FIG. 6 is a view showing analysis results when the ultrasonic transducer 1 (a curved surface sensor) of the embodiment is used. FIG. 7 is a view showing analysis results when the damping material 11 is installed in addition to the ultrasonic transducer 1 (the curved surface sensor) (i.e., a configuration of the flow rate measurement device 100 of the embodiment).

FIGS. 5 to 7 show ultrasonic propagation analysis results (intensity distribution of a sound pressure).

As shown in FIG. 5, transverse waves are excited when excitation in a burst form is performed from an ultrasonic oscillator installed at a left end of FIG. 5, and acoustic waves enter the pipeline while acoustic waves rapidly propagate into the pipeline (a steel pipe). Here, since a ratio of sound velocity between the gas and solid is 10 times or more, acoustic waves in the solid directly arrives at an ultrasonic receiver on an opposite side. However, acoustic waves in the pipeline and the gas are radiated therebetween, and substantially circular sound fields are excited inside and outside the pipe such that complicate acoustic intensity distribution is provided. For this reason, when a planar sensor is used, a signal-to-noise ratio of a waveform that arrives at the ultrasonic receiver is extremely low, and it is difficult to identify acoustic waves in the pipe. Hereinabove, in the structure of the related art in which the clamp-on method and a planar sensor are combined, it is extremely difficult to perform the flow rate measurement.

In FIG. 6, it was confirmed that converging ultrasonic waves are efficiently introduced into the gas (steam) in the pipeline, and simultaneously, acoustic waves arrive at the curved surface sensor (the ultrasonic receiver) in a state in which acoustic waves propagating in the pipeline are significantly weakened. Specifically, it was confirmed that an amplitude level of the received signals as a whole is decreased to about 1/10 or less. This shows that a shape of the sensor exerts a large influence on improvement of the signal-to-noise ratio.

As described above, the structure of the present invention in which the clamp-on method and the curved surface sensor are combined can appropriately perform the flow rate measurement.

Further, also in the flow rate measurement method of combining the clamp-on method and the curved surface sensor, a noise component propagating in the pipeline is still present.

In this case, as shown in FIG. 7, it was confirmed that acoustic waves propagating in the pipeline are reduced in size using the damping material and the noise component arriving at the curved surface sensor (the ultrasonic receiver) can be further reduced in comparison with the case in which only the curved surface sensor is used.

According to the flow rate measurement device 100 of the embodiment in consideration of the above-mentioned analysis results, even in measurement with the clamp-on method (nondestructive inspection) in which the pipeline is not cut, the first element 21 that constitutes the ultrasonic transducer 1 is constituted by the curved surface sensor corresponding to the surface 10a of the pipeline 10. For this reason, the ultrasonic waves can be focused on the center of the pipeline 10.

Accordingly, since refraction or reflection influenced by the curvature of the pipeline 10 is minimized, signal intensity can be improved.

In addition, the second element 22 is constituted by the curved surface sensor corresponding to the surface 10a of the pipeline 10. For this reason, the ultrasonic waves focused on the center of the pipeline 10 can enter the receiving surface 22a perpendicularly.

In addition, in the embodiment, since the damping material 11 is installed on the pipeline 10, the acoustic waves propagating through the pipeline 10 are reduced. For this reason, measurement having high reliability can be performed by improving the intensity of the received ultrasonic signal.

Next, the flow rate measurement method by the flow rate measurement device 100 according to the embodiment will be described. First, the controller 2 begins supply of the steam from the steam manufacturing apparatus 20 into the load facility 30 via the pipeline 10.

Next, the controller 2 drives the ultrasonic transducer 1 and emits ultrasonic waves from the oscillating surface 21a of the first element 21 toward the inside of the pipeline 10. In the embodiment, since the first element 21 constituting the ultrasonic transducer 1 has the oscillating surface 21a having a curvature corresponding to the surface 10a of the pipeline 10, the ultrasonic waves can be focused on the center of the pipeline 10. Accordingly, refraction or reflection influenced by the curvature of the pipeline 10 can be suppressed.

The ultrasonic waves focused on the center of the pipeline 10 are received by the second element 22 installed at an opposite surface side of the pipeline 10 (receiving step). In the embodiment, since the second element 22 constituting the ultrasonic transducer 1 has the receiving surface 22a having a curvature corresponding to the surface 10a of the pipeline 10, the ultrasonic waves focused on the center of the pipeline 10 can enter the receiving surface 22a perpendicularly. Accordingly, measurement having high reliability can be performed by improving the intensity of the received signals.

The signals received by the receiving surface 22a are transmitted to the controller 2. The controller 2 converts the transmitted signals into digital signals using the converter 43 (see FIG. 4) such as an A/D converter or the like and incorporates the converted signals into the CPU 44 (see FIG. 4).

The controller 2 calculates a flow rate of the steam flowing through the pipeline 10 from information stored in the memory 45 (see FIG. 4) using a spatial distribution (distribution data) of the ultrasonic waves acquired by the ultrasonic transducer 1 through the tuft method (flow rate calculation step).

For example, information related to the flow velocity of the steam and the spatial distribution of the ultrasonic waves obtained by pre-experiment, simulation, and so on, is stored in the memory 45. The controller 2 can calculate a flow rate of the steam corresponding to the spatial distribution actually measured (measurement results of the ultrasonic transducer 1) by reading the information stored in the memory 45 and measurement values of the spatial distribution of the ultrasonic waves of the pipeline 10.

As described above, according to the embodiment, the flow rate of the steam flowing through the pipeline 10 can be conveniently and precisely obtained using the ultrasonic waves without destruction of the pipeline 10.

(Second Embodiment)

Next, a flow rate measurement device according to a second embodiment will be described. A difference between the embodiment and the first embodiment is the number of ultrasonic transducers 1 installed on the pipeline 10, and the other components are the same. Hereinafter, the same components and members as the first embodiment are designated by the same reference numerals, and a detailed description thereof will be omitted here.

Figure 8A:
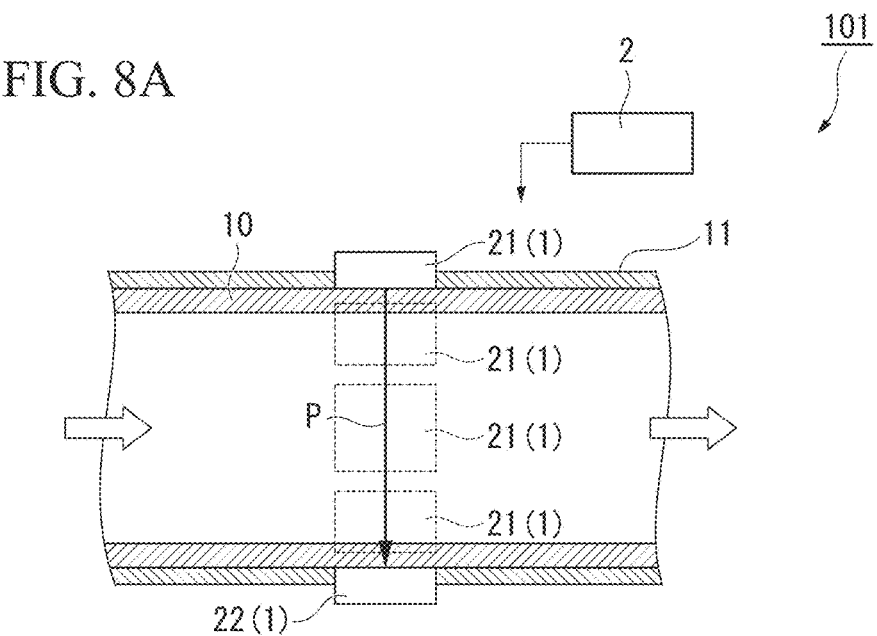
FIG. 8A is a view showing a configuration of major parts of a flow rate measurement device of a second embodiment.
Figure 8B:
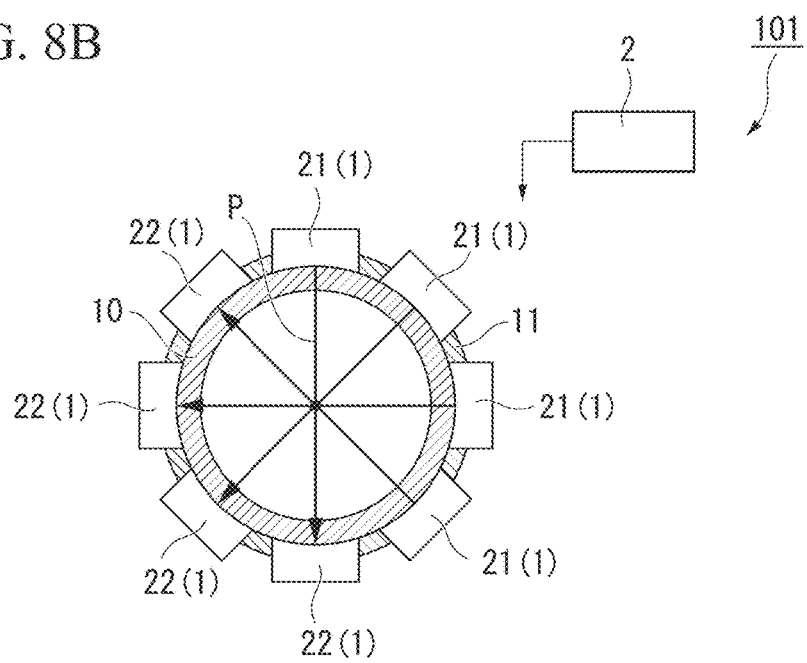
FIG. 8B is a view showing a configuration of major parts of the flow rate measurement device of the second embodiment.

FIGS. 8A and 8B are views showing major components of a flow rate measurement device 101 of the embodiment. FIG. 8A is a cross-sectional view in a tube axis direction of the pipeline 10. FIG. 8B is a cross-sectional view seen in the tube axis direction of the pipeline 10.

As shown in FIGS. 8A and 8B, the flow rate measurement device 101 of the embodiment includes a plurality of (for example, four) ultrasonic transducers 1, and the controller 2. Even in the embodiment, each of the ultrasonic transducers 1 includes the first element 21 and the second element 22.

The ultrasonic transducers 1 are disposed at different positions in a circumferential direction of the pipeline 10 (at angular intervals of 40 degrees). The ultrasonic transducers 1 are electrically connected to the controller 2, and the measurement results are transmitted to the controller 2.

The controller 2 causes the first element 21 to function as the ultrasonic oscillation part and the second element 22 to function as the ultrasonic reception part in each of the ultrasonic transducers 1. However, the first element 21 may also function as the ultrasonic reception part, and the second element 22 may also function as the ultrasonic oscillation part.

Based on the above-mentioned configuration, the flow rate measurement device 101 of the embodiment enables flow rate measurement using ultrasonic waves in four directions in a cross section of the pipeline 10.

Next, a flow rate measurement method by the flow rate measurement device 101 according to the embodiment will be described. First, the controller 2 begins supply of the steam from the steam manufacturing apparatus 20 into the load facility 30 via the pipeline 10.

Here, the case in which a deviation of flow velocity distribution occurs in the pipeline 10 or the case in which a condensation occurs at a lower portion of the pipeline 10 is also assumed. In the above-mentioned case, for example, in a plurality of measurement lines, stable measurement can be performed by performing transmission and reception of the ultrasonic waves in a direction in which a deviation of the flow velocity distribution does not occur in a cross section of the pipeline 10 (a direction in which an eccentric flow does not occur) or a direction in which a condensation does not occur. In addition, results having a large error such as an eccentric flow, a swirl flow, or the like, can be previously removed in advance using the plurality of measurement lines, and measurement precision can be improved by averaging a plurality of measurement results.

In the embodiment, before performing the flow rate measurement, a deviation (distortion) of the flow velocity distribution in the pipeline 10 is determined (determination step). The controller 2 drives the ultrasonic transducers 1 to acquire spatial distribution of the ultrasonic waves acquired by the ultrasonic transducer 1. The controller 2 obtains a measurement line on which the deviation of the flow velocity distribution of the steam flowing through the pipeline 10 occurs, according to data obtained from the plurality of ultrasonic transducers 1. That is, the controller 2 constitutes a determination part configured to determine a deviation of flow velocity distribution of steam flowing through the pipeline 10 (corresponding to a determination part in claims).

The controller 2 selects the ultrasonic transducer 1 used for measurement, according to the determination result of the flow velocity distribution. That is, the controller 2 constitutes a selection part configured to select the ultrasonic transducer 1 used for measurement (corresponding to a selection part in claims).

The controller 2 selects the ultrasonic transducer 1 that can transmit and receive ultrasonic waves, from the plurality of ultrasonic transducers 1, for example, in a direction in which a deviation of the flow velocity distribution does not occur in a cross section of the pipeline 10, a direction in which a condensation does not occur, or in a direction in which a received intensity of the ultrasonic signal is strongest. Then, the controller 2 drives the selected ultrasonic transducer 1.

The selected ultrasonic transducer 1 emits ultrasonic waves from the oscillating surface 21a of the first element 21 toward the inside of the pipeline 10. The emitted ultrasonic waves are appropriately received at the receiving surface 22a of the second element 22 disposed to face the oscillating surface 21a.

The signals received by the receiving surface 22a are transmitted to the controller 2. The controller 2 converts the transmitted signals into digital signals using the converter 43 (see FIG. 4) such as an A/D converter or the like and incorporate the converted signals into the CPU 44 (see FIG. 4).

The controller 2 calculates a flow rate of the steam flowing through the pipeline 10 from information stored in the memory 45 (see FIG. 4) using spatial distribution of the ultrasonic waves acquired by the ultrasonic transducer 1 through the tuft method (a flow rate calculation process).

As described above, according to the embodiment, the flow rate of the steam flowing through the pipeline 10 can be conveniently and precisely obtained using ultrasonic waves without destruction of the pipeline 10.

In addition, the flow rate measurement device 100 of the embodiment can precisely measure the flow rate of the steam (a pressure is 8 atmospheres or less) flowing through the pipeline 10 having a small diameter (for example, a diameter is 4 inches or less), which was difficult to measure in the related art.

Hereinabove, while the embodiments of the present invention have been described, the present invention is not limited to the embodiments and may be appropriately varied without departing from the scope of the present invention.

For example, in the embodiment, an aspect in which the oscillating surface 21a oscillating ultrasonic waves, which serves as a focusing means configured to focus ultrasonic waves on the center of the pipeline 10, has a curved surface corresponding to the surface 10a of the pipeline 10 was exemplified. However, the present invention is not limited thereto. For example, ultrasonic waves may be focused on the center of the pipeline 10 using an acoustic lens serving as a focusing means.

In addition, in the embodiment, the case in which the flow rate measurement is performed by a tuft method has been exemplified. However, the present invention is not limited thereto. For example, the flow rate measurement devices 100 and 101 may also be applied to a case in which the flow rate measurement is performed by a time difference method.

Figure 9:
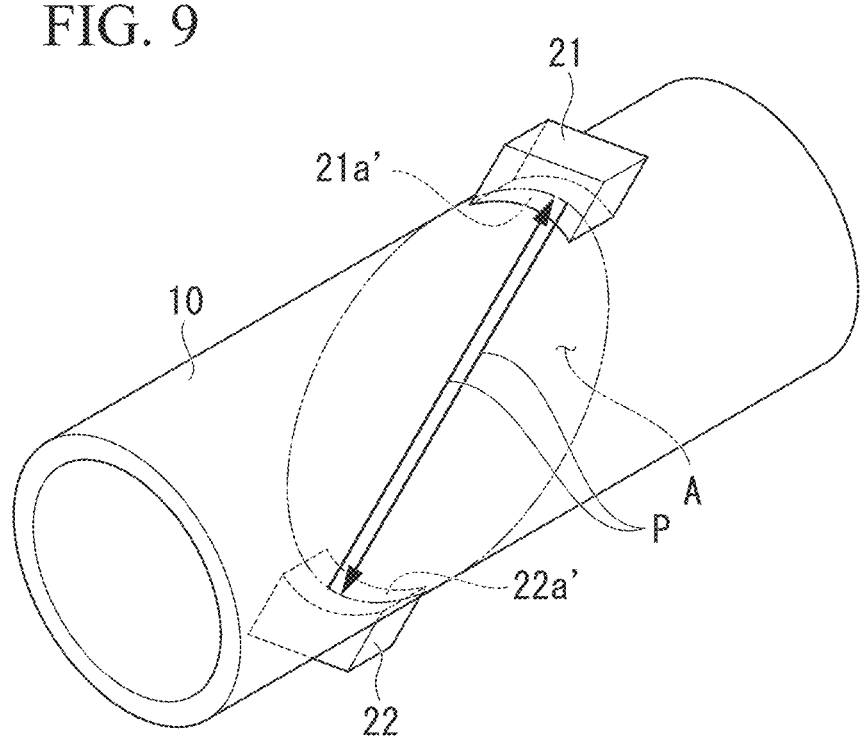
FIG. 9 is a view showing a structure of an oscillating surface and a receiving surface when a time difference method is applied.

In the time difference method, the first element 21 and the second element 22 perform transmission and reception of the ultrasonic waves. In addition, in the time difference method, as shown in FIG. 9, the first element 21 and the second element 22 are installed to be inclined with respect to the tube axis direction of the pipeline 10. A transmitting/receiving surface 21a' of ultrasonic waves in the first element 21 performs transmission and reception of the ultrasonic waves P in a surface A crossing the tube axis direction of the pipeline 10. In addition, a transmitting/receiving surface 22a' of ultrasonic waves in the second element 22 performs transmission and reception of the ultrasonic waves P in the surface A crossing the tube axis direction of the pipeline 10. Further, in FIG. 9, the damping material 11 is omitted here.

Even in the above-mentioned configuration, the transmitting/receiving surfaces 21a' and 22a' also have curved surfaces corresponding to the surface 10a of the pipeline 10, i.e., curved surfaces in which cross-sectional shapes are elliptical in a surface parallel to the surface A. When the first element 21 and the second element 22 having the above-mentioned curved surfaces are used, even in the case in which the time difference method is used, since transmission and reception of the ultrasonic waves P with respect to the inside of the pipeline 10 can be appropriately performed, measurement of the flow velocity of the steam flowing through the pipeline 10 can be precisely performed.

Further, even in the time difference method, for example, as shown in FIG. 3, a spacer member may be disposed in a gap between the pipeline 10 and the ultrasonic transducer 1. Here, an apparatus capable of performing measurement having good versatility in flow rate measurement with respect to the pipeline 10 having various outer diameters even in the time difference method by preparing a plurality of spacer members having different sizes.

In addition, when the flow rate measurement with respect to the pipeline 10 having different outer diameters are performed as described above, instead of the spacer member 13, a flexible member may be used as the ultrasonic transducer 1. Accordingly, since the ultrasonic transducer 1 can be easily bent, the ultrasonic transducer 1 can be securely installed along the surface 10a regardless of the outer diameter of the pipeline 10 by bending the ultrasonic transducer 1 according to the curvature of the surface 10a. Accordingly, a member having good versatility and capable of performing flow rate measurement with respect to the pipeline 10 having various outer diameters is provided.

In addition, in the embodiment, while the configuration in which the pipeline 10 is covered with the damping material 11 has been exemplified, the present invention is not limited thereto. For example, according to the aspect in which the controller 2 corrects data transmitted from the ultrasonic transducer 1 in consideration of a noise component due to acoustic waves that propagate through the pipeline 10, the surface 10a of the pipeline 10 may not be covered with the damping material 11.

In addition, in the embodiment, while the case in which the flow rate of the steam serving as a gas flowing through the pipeline is measured is an exemplary example, the present invention is not limited thereto. For example, the embodiment may also be applied to a case in which a flow rate of air flowing through the pipeline is measured. In addition, the gas flowing through the pipeline may be Freon, ammonia, liquefied natural gas (LNG), and so on, and the present invention may also be applied to a case in which the flow rates of these fluids are measured.

REFERENCE SIGNS LIST

1 Ultrasonic transducer
2 Heating part (heat exchanger, heating device)
3 Temperature measurement part
2 Controller (flow rate calculation part, determination part, selection part)
10 Pipeline
10a Surface
11 Damping material
13, 23 Spacer member
21 First element (ultrasonic oscillation part)
21a Oscillating surface
22 Second element (ultrasonic reception part)
22a Receiving surface
100, 101 Flow rate measurement device

What is claimed is:

1. A flow rate measurement device for measuring a flow rate of a gas flowing inside of a pipeline, the flow rate measurement device comprising:
    an ultrasonic transducer installed so as to be in contact with the pipeline; and
    a flow rate calculation part configured to calculate the flow rate of the gas according to a result of reception of ultrasonic wave from the ultrasonic transducer,
    wherein the ultrasonic transducer comprises an ultrasonic oscillation part configured to emit the ultrasonic wave toward the inside of the pipeline and an ultrasonic reception part configured to receive the ultrasonic wave, and at least the ultrasonic oscillation part has a focusing part configured to focus the ultrasonic wave on a center of the pipeline.

2. The flow rate measurement device according to claim 1,
    wherein the focusing part has an ultrasonic-wave-oscillating-surface having a curvature corresponding to an outer surface of the pipeline.

3. The flow rate measurement device according to claim 2,
    wherein the ultrasonic reception part has a second focusing part, and
    the second focusing part has an ultrasonic-wave-receiving-surface having a curvature corresponding to an outer surface of the pipeline.

4. The flow rate measurement device according to claim 1, further comprising a damping material installed at the pipeline.

5. The flow rate measurement device according to claim 1, further comprising a spacer member that is detachably provided between the pipeline and the ultrasonic transducer,
    wherein the spacer member has an inner diameter equal to a curvature of an outer surface of the pipeline and an outer diameter equal to a curvature of the ultrasonic-wave-oscillating-surface.

6. The flow rate measurement device according to claim 1, further comprising:
a determination part configured to determine a deviation of flow velocity distribution of the gas in the pipeline according to measurement results of a plurality of ultrasonic transducers installed at a plurality of places in a circumferential direction of the pipeline; and
a selection part configured to select one from the plurality of ultrasonic transducers used for measurement according to a determination result of the determination part.

7. The flow rate measurement device according to claim 1,
wherein a center frequency of the ultrasonic wave from the ultrasonic transducer is set to 100 kHz to 1 MHz.

8. The flow rate measurement device according to claim 1,
wherein the flow rate of a gas is measured using a tuft method.

9. A flow rate measurement method of measuring a flow rate of a gas flowing inside of a pipeline, the flow rate measurement method comprising:
a receiving step of receiving ultrasonic wave emitted toward the inside of the pipeline using an ultrasonic transducer including an ultrasonic oscillation part configured to emit the ultrasonic wave toward the inside of the pipeline and an ultrasonic reception part configured to receive the ultrasonic wave emitted by the ultrasonic oscillation part, wherein at least the ultrasonic oscillation part has a focusing part configured to focus the ultrasonic wave on a center of the pipeline; and
a flow rate calculation step of calculating the flow rate of the gas according to a result received in the receiving step.

10. The flow rate measurement method according to claim 9,
wherein, in the receiving step, the focusing part having an ultrasonic-wave-oscillating-surface with a curvature corresponding to an outer surface of the pipeline is used as the ultrasonic transducer.

11. The flow rate measurement method according to claim 10,
wherein, in the receiving step, the ultrasonic reception part having a second focusing part is used as the ultrasonic transducer, and
the second focusing part has an ultrasonic-wave-receiving-surface having a curvature corresponding to the outer surface of the pipeline.

12. The flow rate measurement method according to claim 9,
wherein, in the receiving step, a damping material is disposed at the pipeline.

13. The flow rate measurement method according to claim 9, comprising, previous to the receiving step, a determination step for determining a deviation of flow velocity distribution of the gas in the pipeline according to a result obtained by measuring a flow rate of the gas at a plurality of places in a circumferential direction of the pipeline; and
a selection step of selecting the ultrasonic transducer used in the receiving step according to the result of the determination step.

14. The flow rate measurement method according to claim 9,
wherein a center frequency of the ultrasonic wave from the ultrasonic transducer is set to 100 kHz to 1 MHz.

15. The flow rate measurement method according to claim 9,
wherein the flow rate of the gas is measured using a tuft method.

\* \* \* \* \*